J. W. M. CARMICHAEL.
ELECTRIC RAT EXTERMINATOR.
APPLICATION FILED JUNE 20, 1913.
1,110,186.
Patented Sept. 8, 1914.
2 SHEETS—SHEET 1.
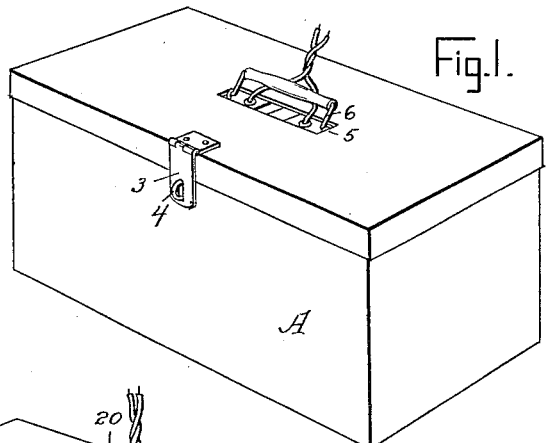
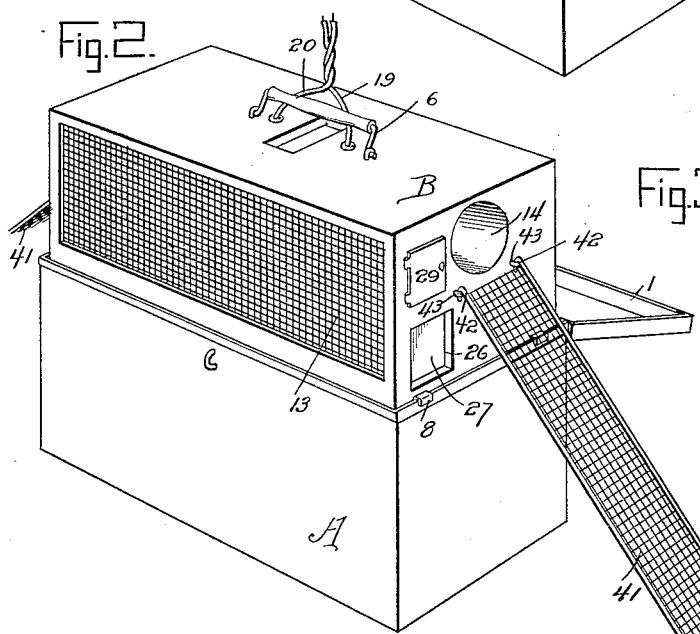
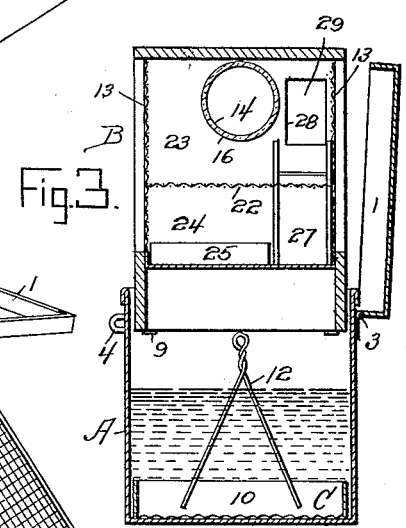
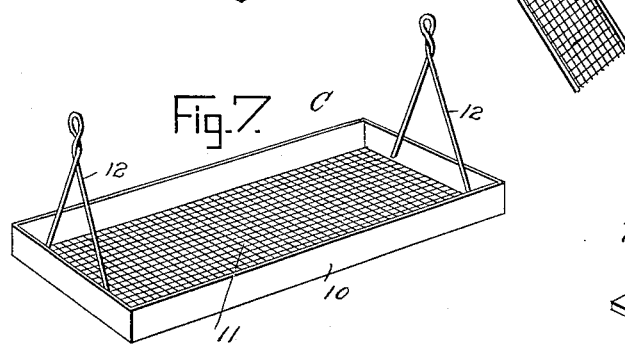
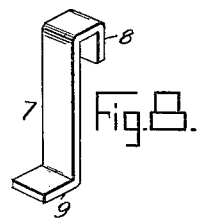
WITNESSES
C. K. Reichenbach.
C. Bradway.
INVENTOR
James W. M. Carmichael
BY Munn & Co
ATTORNEYS J. W. M. CARMICHAEL.
ELECTRIC RAT EXTERMINATOR.
APPLICATION FILED JUNE 20, 1913.
1,110,186.
Patented Sept. 8, 1914.
2 SHEETS—SHEET 2.
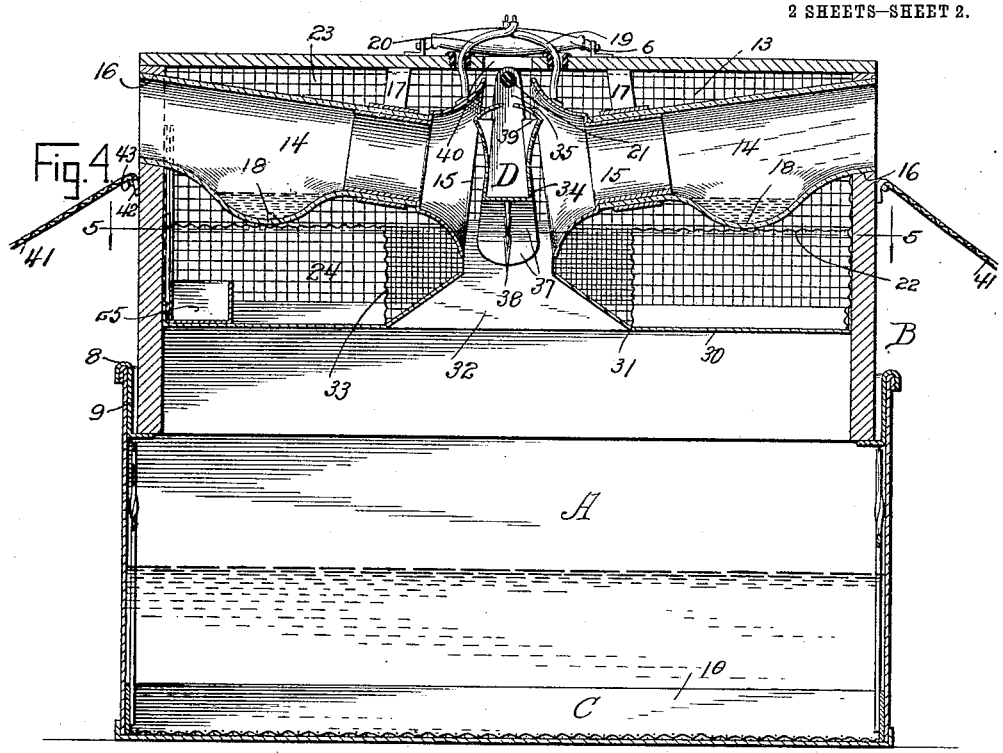
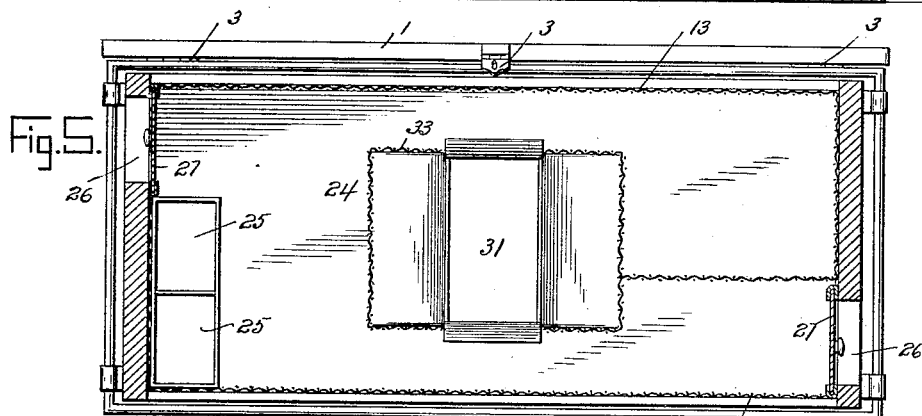
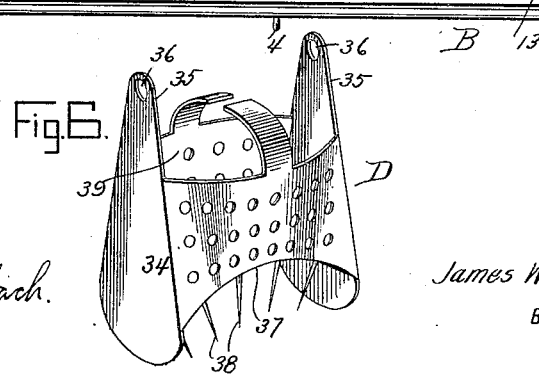
WITNESSES
INVENTOR
James W. M. Carmichael
BY
ATTORNEYS

UNITED STATES PATENT OFFICE.

JAMES W. M. CARMICHAEL, OF WELLSBURG, WEST VIRGINIA.

ELECTRIC RAT-EXTERMINATOR.

1,110,186.        Specification of Letters Patent.        Patented Sept. 8, 1914.

Application filed June 20, 1913. Serial No. 774,822.

*To all whom it may concern:*

Be it known that I, JAMES W. M. CARMICHAEL, a citizen of the United States, and a resident of Wellsburg, in the county of Brooke and State of West Virginia, have invented a new and Improved Electric Rat-Exterminator, of which the following is a full, clear and exact description.

This invention relates to an electric rat exterminator of that type in which a rat is enticed into the device and in attempting to reach the bait is included in an electric circuit, so that current passing through the body of the rat electrocutes it, the present invention being more particularly improvements in the type of exterminators shown in United States Letters Patent Number 1,034,976, granted to me August 6, 1912.

The invention has for one of its objects to improve the construction of apparatus of the character referred to so as to be thoroughly reliable and efficient in use and capable of operating in the circuit of lower voltage, since it is merely necessary to use current of sufficient strength to stun the rats so that they will drop into a body of water and be drowned therein.

Another object of the invention is to provide a plurality of compartments in the cage or trap for holding live rats, food and the like to operate as decoys to attract free rats into the entrance tubes or channels where an entering rat will cause the circuit to be completed through its body, whereby the stunned rat will drop and be drowned in the tank in which the cage is set, the tank usually containing water, except in freezing weather, when brine will be employed.

Another object of the invention is the provision of a tank which serves as a casing or box to contain the cage or trap when the latter is not in use, there being hangers which are adapted to be hooked on the top of the tank to form rests on which the bottom of the cage is seated when in use.

A further object is the provision of a tray that normally sets in the bottom of the tank and is removable in water to take out the rats that have been entrapped and drowned in the device.

With these objects in view, and others as will appear as the description proceeds, the invention comprises various novel features of construction and arrangement of parts which will be more fully described hereinafter and set forth with particularity in the claims appended hereto.

In the accompanying drawings, which illustrate one embodiment of the invention, and wherein similar reference characters are employed to designate corresponding parts throughout the several views, Figure 1 is a perspective view of the apparatus when not in use; Fig. 2 is a perspective view showing the cage in position for use; Figs. 3 and 4 are vertical transverse and longitudinal sections of the apparatus; Fig. 5 is a horizontal section on the line 5—5 of Fig. 4; Fig. 6 is a perspective view of the bait basket or movable contact; Fig. 7 is a perspective view of the tray; and Fig. 8 is a perspective view of one of the cage supporting hangers.

Referring to the drawings, A designates the casing or tank of the apparatus, and B the cage or trap, the tank being in the form of a box and of such size as to entirely house the cage when the latter is not in use, the tank or casing A having a lid or top 1 fastened to the tank by hinges 2, and provided with a hasp 3 which coöperates with a loop 4 on the tank to hold the lid in closed position, as shown in Fig. 1, the lid having an opening 5 through which the handle 6 of the tip of the cage is adapted to protrude.

The cage B is a box-like structure which is adapted when in use to extend slightly into the tank and rest on hangers 7 constructed as shown in Fig. 8, the hooks 8 of the hangers all gripping over the rim of the tank A at opposite ends or adjacent the corners, and the feet 9 of the hangers serving to engage the bottom of the cage B. When the cage is to be stored in the tank or casing A the hangers 7 are removed and placed on the bottom of the tank, and then the cage is inserted, the lid then being closed and locked in such position.

In the bottom of the tank, which latter is adapted to be about half filled with water or brine, is a tray or rat-removing device C, which, as shown in Fig. 7, consists of a rectangular frame 10 having a reticulated bottom 11, there being upright members or bridles 12 at the ends of the tray to form convenient handholds for enabling the tray to be lifted out of the tank to remove the rats that have been exterminated. Of course it is necessary to lift out the cage before the device C can be removed from the tank A.

The cage B is of any approved structure, with one or more sides made of wire mesh 13, so that live rats as decoys and bait will serve to entice free rats into the cage. Entrance to the cage is effected from either end through entrance channels or passages 14 which are preferably of glass, except at their inner ends, where metallic extensions or contact pieces 15 of flaring form are provided, said stationary contact pieces 15 being spaced apart to accommodate between them a bait-holding basket or movable contact D. The outer ends of the entrance tubes or passages 14 are fitted in openings 16 in the end walls of the cage, while the inner ends of the tubes are sustained by supports 17. The tubes or passages 14 have at points intermediate their ends, depressions 18 for holding water, whereby the rats in passing to the bait basket wet their feet and thereby insure a better current-conducting contact with the metal extensions 15. The extension pieces 15 are connected in circuit with a suitable source of current by wires 19 and 20, and the metallic bait basket D is adapted to be moved into engagement with the other fixed contact 15 by a rat in attempting to remove bait from the basket, the latter being pressed in one direction or the other by the rat, so that current passes from one fixed contact 15, the body of the rat, bait basket D, and the other fixed contact 15 with which the basket is pressed into engagement by the rat. The basket D is pivotally supported or suspended within the cage by a rod 21 or equivalent means made of insulation.

Immediately under the entrance tubes 14 is a horizontal partition 22 of wire or the like, dividing the cage into upper and lower compartments 23 and 24, the upper compartment serving to contain food and water in order to attract outside rats, and in the lower compartment live captive rats may be contained to serve as decoys for free rats. there being in the compartment 24 receptacles 25 for holding food and water. For access to the compartment 24 for placing therein or removing therefrom captive rats and for supplying food and water and for cleaning, openings 26 are provided in the ends of the cage, which openings are normally closed by doors 27. The upper compartment also has openings 28 and doors 29, so that the bait can be placed therein. The bottom 30 of the lower compartment is made of sheet metal and has an opening 31 at the center, where an inverted funnel 32 is formed directly under the flared extensions 15, and through this funnel or passage 32 the stunned rat drops into the tank A. Around the funnel or passage 32 is a surrounding wall 33 of wire mesh.

A bait basket or movable contact D, as shown in Fig. 6, comprises a metal body 34 having upwardly-extending spaced lugs or arms 35 provided with openings 36, through which the insulating support 21, Fig. 1, extends, thereby freely suspending the bait basket. The under arched bottom 37 of the basket is provided with spears or teeth 38 for preventing the rats from passing from one entrance tube 14 to the other, or from working their way back through the flaring extension pieces 15 after the rat starts to slip into the discharge passage or funnel 32. The top 39 of the basket is directly under an opening 40 in the top of the cage, so that bait can be supplied to the basket or emptied therefrom.

In using the device, the tank is half filled with water, and after the tray C is placed in the bottom of the tank the hangers 7 are properly positioned, as shown in Fig. 4. The cage B is now reset into the tank and seated on the hangers. Water is supplied to the depressions or cups 18, and the circuit containing the extensions 15 is closed by a suitable switch. Assuming that bait and the decoys are in the cage, the apparatus is now ready for use. In order to obtain access to the cage the enticed rats walk up the inclines or runways 41, which are attached to the cage by means of hooks 42 at the upper ends of the runways, engaging in eyes 43. In entering the downwardly-inclined entrance tubes 14 the rat steps into the water in the depressions 18 and then continues into the metallic extensions 15, and attempting to take out bait from the basket B the rat pushes the freely movable basket toward the opposite extension piece 15, thereby closing the electric circuit through his body. The stunned rat thereupon drops into the tank A and is drowned. When the exterminated rats are to be removed, the cage B is taken off, the hanger 7 is removed and the tray C lifted out with the dead rats thereon. After emptying, the parts are then restored to their proper position, so that the cage will be ready for further use.

From the foregoing description taken in connection with the accompanying drawings, the advantages of the method of operation and of the apparatus shown will be readily understood by those skilled in the art to which the invention appertains, and while I have described the apparatus which I now consider to be the best embodiment thereof, I desire to have it understood that the apparatus shown is merely illustrative, and that such changes may be made when desired as are within the scope of the appended claims.

Having thus described my invention, I claim as new and desire to secure by Letters Patent:

1. The combination of a tank provided with a lid, with a cage of such size as to be stored in the tank when not in use, a plurality of hangers removably positioned on the body of the tank when the lid is open to support the cage in the upper portion of the tank, and a removable tray in the bottom of the tank for removing the exterminated rats.

2. The combination of a tank, a tray therein having upright bridles forming handholds, a cage adapted to be positioned in the tank between the said bridles, and means for supporting the cage in operative position at the top of the tank.

3. A cage comprising a body, entrance passages leading into the body, metallic pieces at the inner ends of the passages, one piece being spaced from the other, a pendant bait holder mounted between the metallic pieces and movable into engagement with either, and sharp downwardly extending teeth fixed on the bottom of the bait holder.

4. The combination of a tank adapted to hold water, a tray arranged within the tank and normally resting on the bottom thereof, a cage of such size as to be inclosed in the tank and adapted to nest in the tray, the ends of the cage being spaced from the ends of the tank, members fastened to the ends of the tray and extending upwardly between the ends of the tank and cage, said members being of less length than the depth of the tank, and a cover for the tank.

In testimony whereof I have signed my name to this specification in the presence of two subscribing witnesses.

JAMES W. M. CARMICHAEL.

Witnesses:
F. E. ADAMS,
J. A. GIST.

---

Copies of this patent may be obtained for five cents each, by addressing the "Commissioner of Patents, Washington, D. C."